United States Patent
Polasa et al.

(10) Patent No.: US 12,026,697 B2
(45) Date of Patent: Jul. 2, 2024

(54) SYSTEM AND METHOD FOR SEGMENT SECURITY USING A CERTIFICATE RIGHT ON A DISTRIBUTED NETWORK

(71) Applicant: BANK OF AMERICA CORPORATION, Charlotte, NC (US)

(72) Inventors: Puneetha Polasa, Telangana (IN); Hope Barus, Fort Mill, SC (US); Ana Morales, Huntersville, NC (US); Sandra Ogden, Frisco, TX (US); Lee Ann Proud, St. Augustine, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 187 days.

(21) Appl. No.: 17/744,346

(22) Filed: May 13, 2022

(65) Prior Publication Data
US 2023/0368184 A1    Nov. 16, 2023

(51) Int. Cl.
*G06Q 20/00*     (2012.01)
*G06Q 20/36*     (2012.01)
*G06Q 20/38*     (2012.01)
*G06Q 20/40*     (2012.01)

(52) U.S. Cl.
CPC ....... *G06Q 20/363* (2013.01); *G06Q 20/3674* (2013.01); *G06Q 20/3825* (2013.01); *G06Q 20/4014* (2013.01)

(58) Field of Classification Search
CPC ............ G06Q 20/363; G06Q 20/3674; G06Q 20/3825; G06Q 20/4014
USPC ................. 705/16, 21, 59; 380/44, 262, 278
See application file for complete search history.

(56) References Cited

U.S. PATENT DOCUMENTS

| | | |
|---|---|---|
| 7,493,190 B1 | 2/2009 | Tomassi |
| 7,606,770 B2 | 10/2009 | Pinnell |
| 9,875,510 B1 | 1/2018 | Kasper |
| 10,721,069 B2 | 7/2020 | Konda et al. |
| 10,839,320 B2 | 11/2020 | Augustine et al. |
| 11,244,309 B2 | 2/2022 | Bentov et al. |
| 11,301,460 B2 | 4/2022 | Rich et al. |
| 2006/0036537 A1 | 2/2006 | Lawrence et al. |
| 2006/0136337 A1 | 6/2006 | Sheikhrezai et al. |
| 2008/0004969 A1 | 1/2008 | Shniberg et al. |
| 2016/0140460 A1 | 5/2016 | Boyd, Jr. |
| 2017/0278081 A1 | 9/2017 | Walker et al. |
| 2019/0095916 A1 | 3/2019 | Jackson |
| 2019/0303888 A1 | 10/2019 | Hamasni et al. |
| 2020/0042989 A1 | 2/2020 | Ramadoss et al. |
| 2020/0320825 A1 | 10/2020 | Simons |
| 2021/0097508 A1 | 4/2021 | Papanikolas |
| 2021/0133700 A1 | 5/2021 | Williams et al. |
| 2021/0357489 A1 | 11/2021 | Tali et al. |

(Continued)

*Primary Examiner* — Dante Ravetti
(74) *Attorney, Agent, or Firm* — Moore & Van Allen PLLC; Nicholas C. Russell (57) ABSTRACT

Embodiments of the invention are directed to systems, methods, and computer program products for onboarding digital content to a platform designed specifically for seamless creation and user-friendly management of non-fungible tokens. The invention allows for users with zero knowledge of decentralized protocols to leverage the benefits of such technologies by providing a system for uploading existing digital content, automating the creation of one or more non-fungible tokens, managing permissioned access to the non-fungible tokens, and facilitating the ownership verification of the non-fungible tokens.

20 Claims, 5 Drawing Sheets

(56) References Cited

U.S. PATENT DOCUMENTS

| | | |
|---|---|---|
| 2022/0123948 A1 | 4/2022 | Wentz et al. |
| 2022/0188930 A1 | 6/2022 | Koch et al. |
| 2022/0215362 A1 | 7/2022 | Koch |
| 2023/0186281 A1* | 6/2023 | Todasco ........... G06Q 20/38215 705/64 |

* cited by examiner

SYSTEM AND METHOD FOR SEGMENT SECURITY USING A CERTIFICATE RIGHT ON A DISTRIBUTED NETWORK

BACKGROUND

Decentralized systems for authentication, verification, and information storage are becoming more prevalent, but the use of such systems may be cumbersome to users who are unfamiliar with their operation. As such, there is a need for systems and methods which provide the end user with a convenient, user-friendly interface for storing, accessing, and verifying a wide range of file types in a distributed and decentralized fashion. Online resource transfers may be specifically confusing or susceptible to user error or unauthorized use. Entities which are responsible for online resource transfers are required to put in place various precautionary measures to reduce these instances. However, with the recent developments in decentralized technology, there is an opportunity to validate legitimacy of the resource actions in a more streamlined and user friendly manner.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing a distributed platform system for integration of existing digital unique resources within a decentralized storage and authentication system. In some instances, one or more users may wish to secure their existing digital work against unauthorized copying, distribution, alteration, or the like, and may wish to leverage the use of decentralized systems in order to store the digital works and provide a means of instant validation of the unique works. In further embodiments, users may wish to further employ validated unique works as a means of identity or account verification. Doing so may involve tokenizing the digital content and storing it on a decentralized blockchain, which allows the user complete control over access to the works, prove ownership in a decentralized fashion, and transfer ownership if necessary.

Given the unique nature of these digital files, an appropriate representation of the unique works may be a non-fungible token, or NFT. The present invention aggregates data from one or more decentralized systems in a convenient fashion to provide end users with a single, user-friendly portal for creation of and management of non-fungible tokens (NFTs) for the purposes of using these NFTs for identity verification in various use-cases where conventional identity or account verification may be cumbersome or subject to user error or intentional unauthorized use. For instance, once the work is stored on a distributed register or blockchain, the system may offer custodial services for private keys, may provide convenient links to one or more verification records, and may generally act as a trusted portal for users to integrate their current or future NFTs within a decentralized ecosystem. The portal may also be used to collect and summarize NFTs for selection as identity verification tools.

The present invention may include a publicly or semi-publicly accessible feature, a "platform," or "portal," wherein one or more entities or users may utilize the system for verification or viewing purposes. In some embodiments, this may be a public facing portal which allows a user to upload one or more pieces of digital content. The platform may facilitate the storage of the digital content on the blockchain, and may facilitate the creation of an NFT signifying the content. Once the NFT has been created, the platform system may validate the blockchain signature of the NFT against information on the blockchain in order to validate that the NFT is authentic, and may access an internal database of private keys in order to verify ownership of the NFT based on one or more user accounts. In some embodiments, the managing entity of the present invention's platform system may be a trusted entity in the financial industry. As such, the entity may leverage its reputation in order to promote trust in the verification of ownership, and also may leverage its access to resources and resource transaction channels as a means to collect payment for accessing NFTs or transferring ownership of NFTs. In some embodiments, the invention may respond to one or more requests for verification or ownership, thereby providing an authoritative response as to whether their particular NFT is properly verified. In some embodiments, the present invention may manage access to one or more NFTs in a secure, trusted manner. In other embodiments, the invention may integrate an NFT platform with one or more existing user resource accounts with an entity system, and may facilitate the transfer of resources to and from the existing user resource accounts for matters related to the one or more NFTs of the user.

Embodiments of the invention relate to systems, methods, and computer program products for user verification using unique digital content, the invention generally including the following operations: store one or more non-fungible tokens in a user wallet; generate a user account containing one or more user credentials for a user, and cross reference the user account with the user wallet and one or more non-fungible tokens; receive a request to verify the user based on the one or more non-fungible tokens; access the user account and user wallet to verify ownership of the one or more non-fungible tokens; and transmit verification of the user's identity based on verifying ownership of the one or more non-fungible tokens.

In some embodiments, the invention is further configured to provide access to the user wallet via a mobile application on a user device.

In some embodiments, the request to verify the user based on the one or more non-fungible tokens further comprises a wallet address.

In some embodiments, verifying ownership of the one or more non-fungible tokens further comprises accessing a distributed register to verify ownership history for the one or more non-fungible tokens.

In some embodiments, verification of the user's identity further comprises using a one-time password in addition to the one or more non-fungible tokens.

In some embodiments, the invention is further configured for receiving a transaction request accompanying the request to verify the user.

In some embodiments, the one or more non-fungible tokens further comprise one or more visual image files stored on a distributed register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate a market value of a property held by a user, including property that is stored and/or maintained by a third-party entity. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, digital currency, loyalty points, or the like), and/or payment credentials (account numbers, payment instrument identifiers). Unless specifically limited by the context, a "resource transfer" a "transaction", "transaction event" or "point of transaction event" may refer to any activity between a user, a merchant, an entity, or any combination thereof. In some embodiments, a resource transfer may refer to the purchase of digital content, wherein the ownership of the digital content is transferred between users, or purchase of the right of access to digital content, wherein one or more users may pay to view, listen to, or otherwise experience or use digital content, but ownership of the content does not change in the course of the resource transfer. In some embodiments, resource transfers may be automatically initiated upon recognition that one or more users has accessed certain content, and the system may facilitate the movement of resources between accounts such that the verified owner of digital content is paid accordingly.

In some embodiments, an internally managed and locally decentralized private blockchain is proposed as decentralized and trusted storage solution, or "distributed register database." It is understood that in such embodiments, the owning organization or entity of the system will have authority to sign or write to the chain, producing faster output and offering privacy and security to the contents of the chain. In other implementations, for example, where one or more third party entities or organizations utilize the present invention, it may be preferable to employ a public blockchain retaining the benefits of a truly decentralized storage mechanism, but offering selective permissioned access to a public or a semi-public portal for management, access, and transfer of resources or content stored on the public blockchain.

As discussed, in some embodiments, the present invention also includes a publicly or semi-publicly accessible feature or "portal" wherein one or more entities or users may utilize the system for content verification and management purposes. In some embodiments, this may be a public facing portal which allows a user to upload or submit digital content. In instances of authenticity or ownership verification, the portal will then process the content, extract the embedded blockchain signature, and then either forward the signature to a processing system or process it locally on the extracting server. The processing system will compare the embedded blockchain signature with the data from the distributed register and validate that the embedded signature and the data stored on the system and the blockchain match. This response is then presented back to the requesting user thereby giving them an authoritative response as to the ownership and access rights of the content. In some embodiments, the portal may aid in the proper authorization of, access to, and distribution of digital content stored on the blockchain. The portal also provides a way to ascertain if content is being used by third parties without explicit permission by comparing data signatures of custodied content against data sourced from other entities or parties in order to identify unauthorized copying or distribution.

Figure 1:
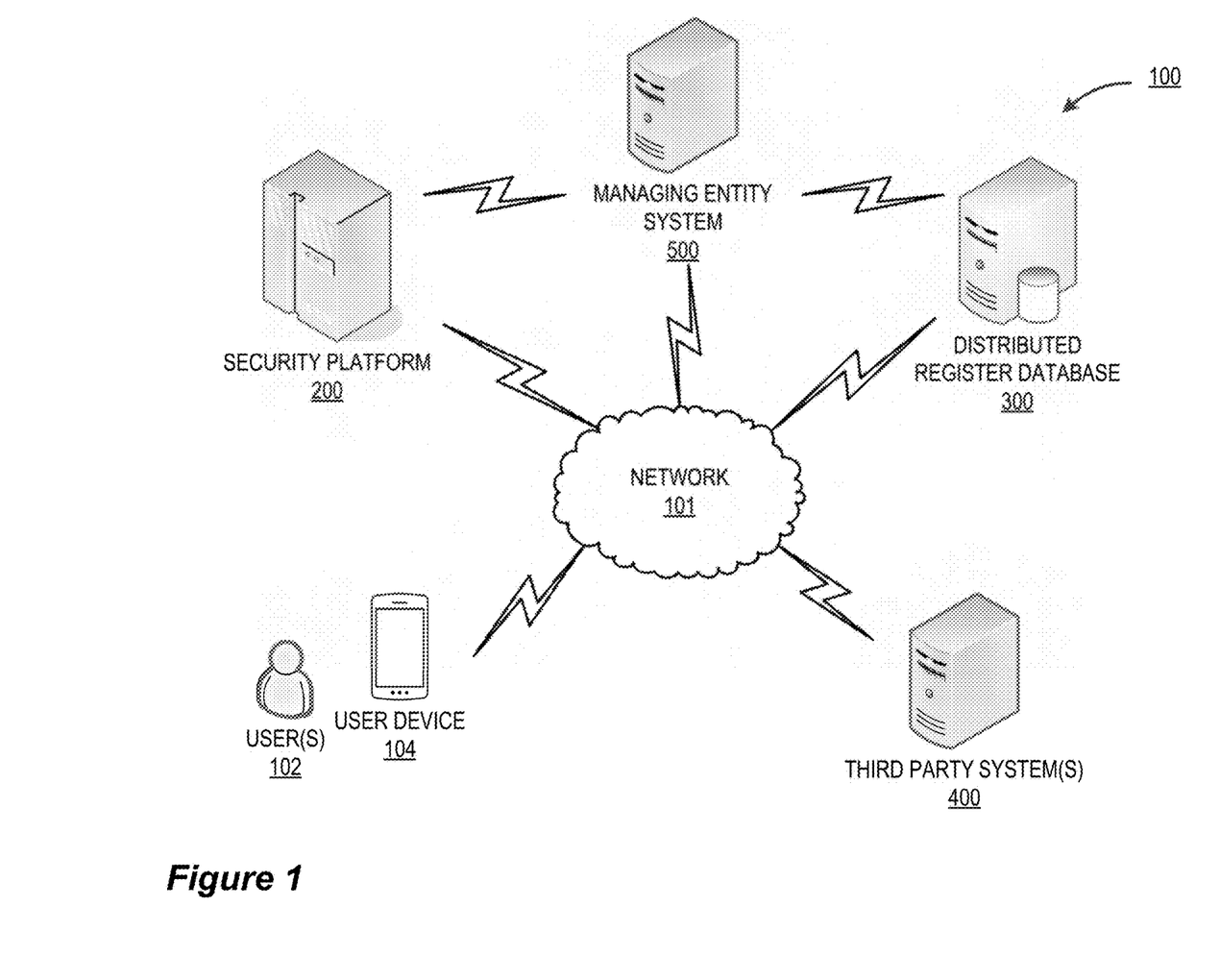
FIG. 1 illustrates an operating environment for a security platform, in accordance with some embodiments of the invention.

FIG. 1 illustrates an operating environment for a security platform, in accordance with one embodiment of the present disclosure. As illustrated, the operating environment 100 may comprise a user 102 and/or a user device 104 in operative communication with one or more third party systems 400 (e.g., web site hosts, registry systems, databases, third party entity systems, or the like). The operative communication may occur via a network 101 as depicted, or the user 102 may be physically present at a location separate from the various systems described, utilizing the systems remotely. The operating environment also includes a managing entity system 500, a security platform 200, a distributed register 300, and/or other systems/devices not illustrated herein and connected via a network 101. As such, the user 102 may request information from or utilize the services of the security platform 200, or the third party system 400 by establishing operative communication channels between the user device 104, the managing entity system 500, and the third party system 400 via a network 101.

Typically, the security platform 200 and the distributed register 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256 which stores user account data 257. The data repository 256 may also contain user data. This user data may be used by the managing entity to authorize or validate the identity of the user 102 for accessing the system (e.g., via a username, password, biometric security mechanism, 2 factor authentication mechanism, or the like). In some embodiments, the managing entity system is in operative communication with the security platform 200 and distributed register 300 via a private communication channel. The private communication channel may be via a network 101 or the security platform 200 and distributed register 300 may be fully integrated within the managing entity system 500, such as a virtual private network (VPN), or over a secure socket layer (SSL).

The managing entity system 500 may communicate with the security platform 200 in order to transmit data by or via a plurality of third party systems 400. In some embodiments, the managing entity may utilize the features and functions of the distribution platform system to upload content and manage its ownership or distribution. In other embodiments, the managing entity and/or the one or more third party systems may utilize the distribution platform system via a portal or application in order to query the distributed register 300 for verification purposes. In some embodiments, this may be a public facing portal which allows a user to upload content and provide secure links to view or access the content. In doing do, the security platform 200 may process and validate non-fungible tokens (NFTs) on the distributed register database which correspond to unique tokenized data on the distributed register, and which may be verified as to their authenticity, custody, ownership, or the like. This response is then presented back to the requesting user thereby giving them an authoritative response as to whether their content is authentic, or has been properly authorized for use, signed, distributed, or the like.

The publicly facing portal of the security platform 200 may also provide a way to ascertain if content is truly owned by a purported owner. The process to identify data that contains privately owned content in the past has largely been limited by existing technology to identify intellectual property elements manually. As such, the identification of protected content in the past has often been a manual, labor-intensive task. The present invention allows a trusted source for custody and management of unique digital content and providing information to users in an intuitive fashion which allows them to verify authenticity of the content, and by association, authenticate user identity of those who hold the private keys to such content.

Figure 2:
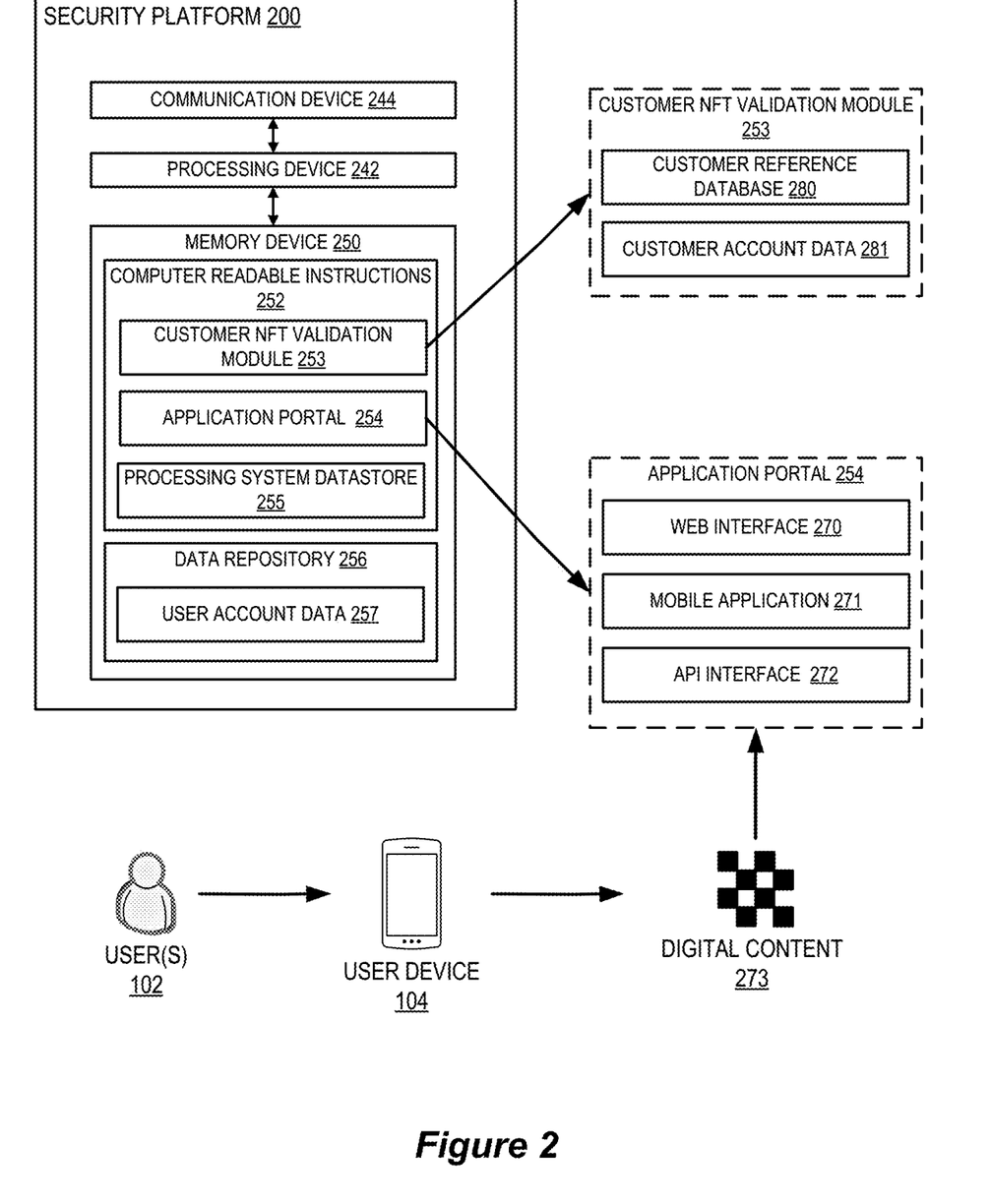
FIG. 2 is a block diagram illustrating the security platform, in accordance with some embodiments of the invention.

FIG. 2 illustrates a block diagram of the security platform 200 associated with the operating environment 100, in accordance with embodiments of the present invention. As illustrated in FIG. 2, the security platform 200 may include a communication device 244, a processing device 242, and a memory device 250 customer NFT validation module 253, an application portal 254 and a processing system datastore 255 stored therein. As shown, the processing device 242 is operatively connected to and is configured to control and cause the communication device 244, and the memory device 250 to perform one or more functions. In some embodiments, the customer NFT validation module 253 and/or the application portal 254 comprises computer readable instructions that when executed by the processing device 242 cause the processing device 242 to perform one or more functions and/or transmit control instructions to the distributed register 300, the managing entity system 500, or the communication device 244. It will be understood that the customer NFT validation module 253 or the application portal 254 may be executable to initiate, perform, complete, and/or facilitate one or more portions of any embodiments described and/or contemplated herein. The customer NFT validation module 253 may comprise executable instructions associated with data processing and analysis related to retrieval and submission of block chain data. The security platform 200 may be owned by, operated by and/or affiliated with the same managing entity that owns or operates the managing entity system 500. In some embodiments, the security platform 200 is fully integrated within the managing entity system 500.

The customer NFT validation module 253 may further comprise a customer reference database 280, and customer account data 281. The customer reference database 280, and customer account data 281 may store instructions and/or data that may cause or enable the security platform 200 to receive, store, and/or analyze data received by the managing entity system 500 or the distributed register 300. The data analysis module 260 may process data to identify or retrieve relevant data from a decentralized ledger of transaction information. For instance, the data analysis module 260 may intelligently trace a number of complex transactions involving one or more specific NFTs and digital currency wallets in order to determine current ownership, or registration with the security platform 200 to associate a specific user identity with a particular NFT.

The customer NFT validation module 253 may also contain metadata related to digital content or NFTs (e.g., location, time, associated party, data format, color, certificate value, hash value, private key, ownership information, wallet address, permitted uses, royalties or payments for use, or the like). In some embodiments, the customer NFT validation module 253 may act as a data interjector for submitting proposed data records to the distributed register 300. In some embodiments, content initially submitted by the customer NFT validation module 253 may be tokenized and stored on the distributed register as a unique token or NFT.

The application portal 254 may further comprise a web interface 270, a mobile application 271, or an API interface 272. In some embodiments, the user 102 may submit digital content 273 via the user device 104 via the one or more components of the application portal 254. In this way, the security platform 200 may receive submissions from one or more users 102 in the form of digital content 273, and may further use the capabilities of the customer NFT validation module 253 in order to communicate with the distributed register database for identification, comparison, and analysis of authenticity, ownership, custody, or permitted uses of one or more aspects or features contained within the digital content 273. It is understood that the application portal may interact with the user device 104 via a web interface 270, mobile application 271, or an API interface 272, and in some embodiments a portion, complementary component, or all of each of these application portal aspects may exist locally on the user device as an entity application 1048 or user application 351, as discussed in FIG. 3. In some embodiments, the invention may utilize ERC-721 standards in onboarding of digital works to the Ethereum network through the creation of smart contracts to manage access to, and payment for, digital works.

The communication device 244 may generally include a modem, server, transceiver, and/or other devices for communicating with other devices on the network 101. The communication device 244 may be a communication interface having one or more communication devices configured to communicate with one or more other devices on the network 101, such as the security platform 200, the user device 104, other processing systems, data systems, etc.

Additionally, the processing device 242 may generally refer to a device or combination of devices having circuitry used for implementing the communication and/or logic functions of the security platform 200. For example, the processing device 242 may include a control unit, a digital signal processor device, a microprocessor device, and various analog-to-digital converters, digital-to-analog converters, and other support circuits and/or combinations of the foregoing. Control and signal processing functions of the security platform 200 may be allocated between these processing devices according to their respective capabilities. The processing device 242 may further include functionality to operate one or more software programs based on computer-executable program code 252 thereof, which may be stored in a memory device 250, such as the application portal 254 and the customer NFT validation module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the security platform 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

Figure 5:
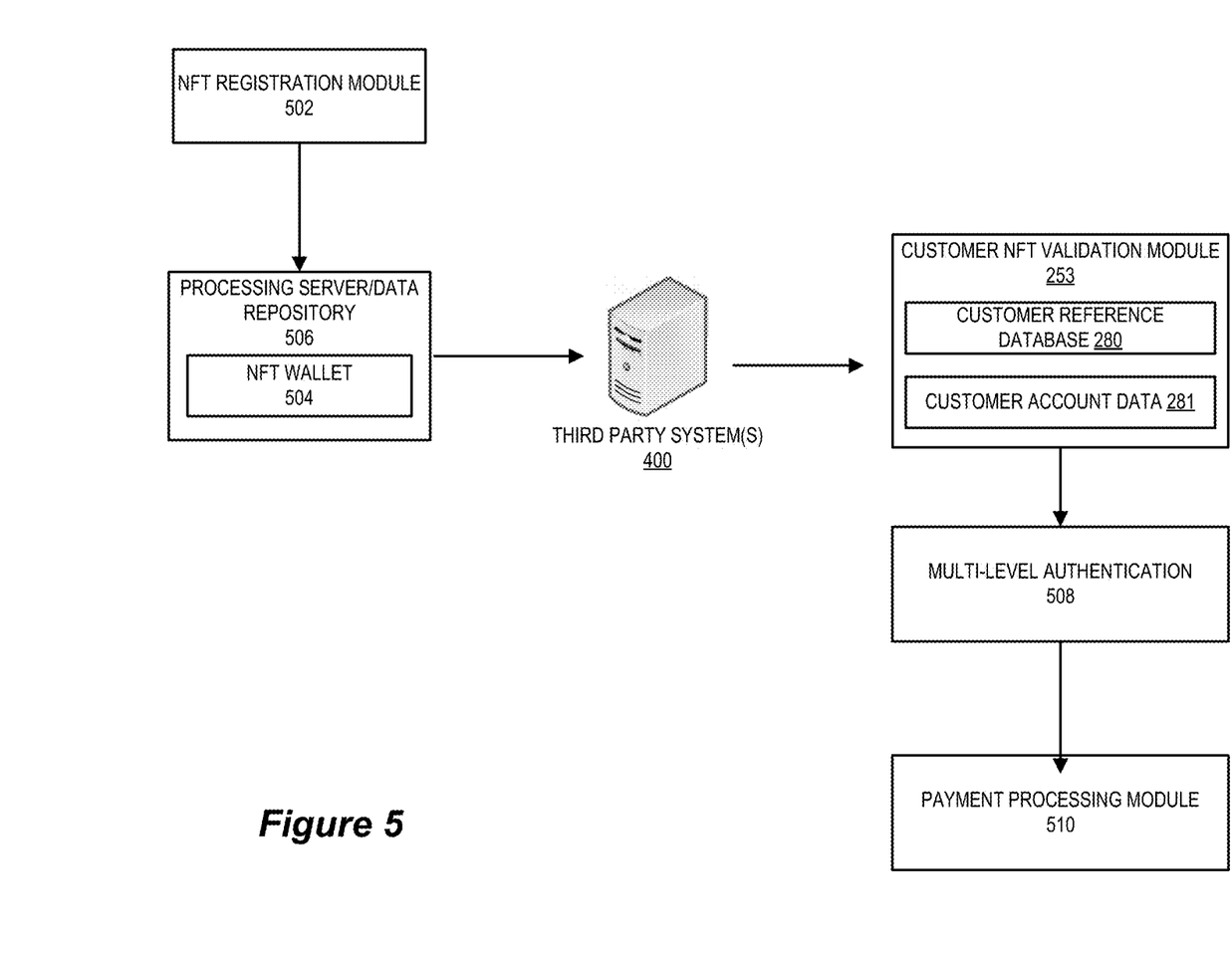
FIG. 5 is a process flow diagram illustrating NFT registration and transaction execution, in accordance with some embodiments of the invention.

Once the system has stored the digital content in the user account, the security platform 200 may generate a smart contract for creation of an NFT based on the digital content (e.g., using ERC-721, or other like protocol to communicate with an existing block chain, generate a smart contract, and upload data for storage in the smart contract), as shown in block 520. The system may receive a private access key for the smart contract and store the private key in the user account for later reference. In some embodiments, the security platform 200 may provide the private key to the user via the application portal 254; however, in preferred embodiments, the security platform 200 will manage and store private keys for NFTs and digital wallets within the user account in order to provide a simplified and streamlined experience to the user, wherein they may access any or all of their digital resources, NFTs, or the like, via the security platform 200 by simply providing their authentication credentials to log into the application portal 254. In this way, the user need not be well versed in the nuances or best practices of managing or storing their digital wallet, digital currency, or digital artwork keys, and may simply use the security platform 200 to access, view, manage, transfer, their digital resources, or the like.

The security platform 200 may provide, via the application portal 254, web interface 270, or mobile application 271, one or more NFT management options to the user. These options may include links to share the NFT with others who may wish to view, listen to, or watch it, depending on the type of digital content, or may also include options to transfer ownership, transfer to a different wallet, retrieve an estimated market value, configure access permissions, or the like.

Figure 3:
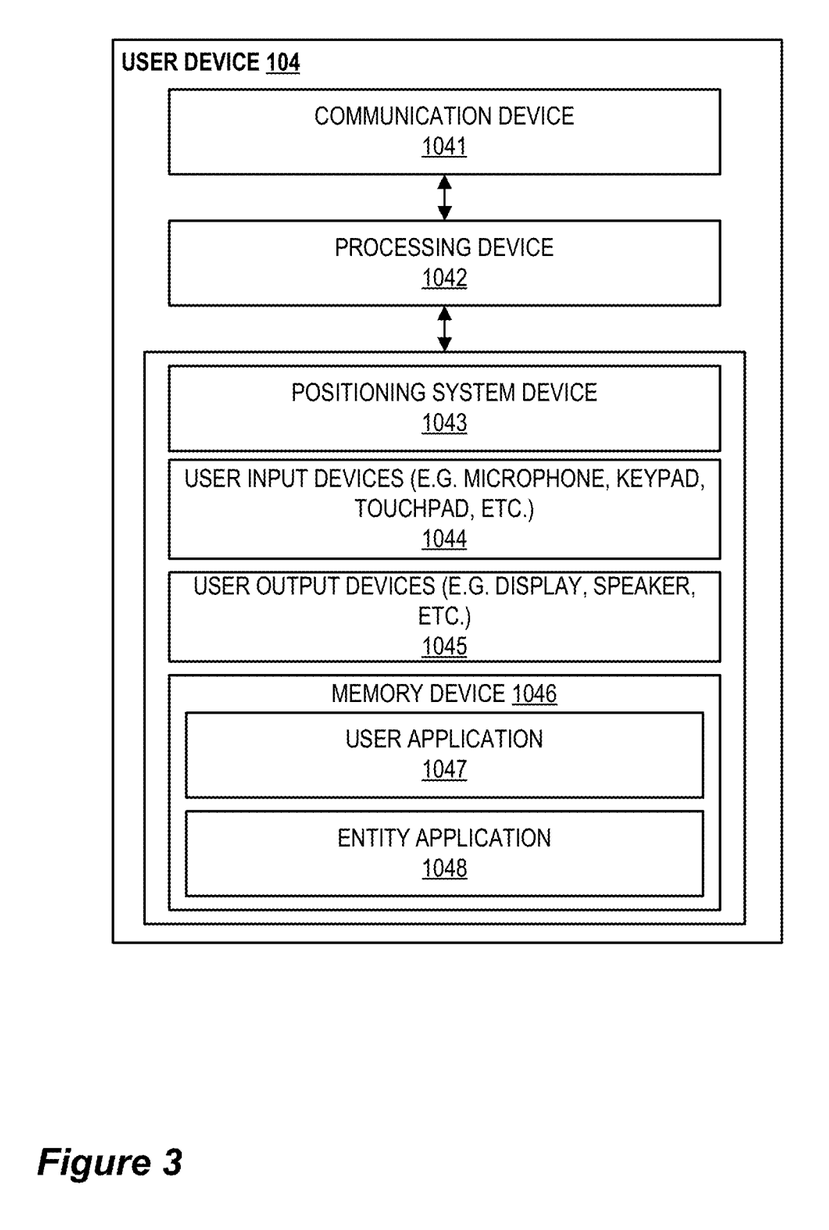
FIG. 3 is a block diagram illustrating a user device associated with the distribution platform system, in accordance with some embodiments of the invention.

FIG. 3 illustrates a block diagram of the user device associated with the distribution platform system, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, entertainment devices, laptop computers, cameras, video recorders, audio/video player, radio, GPS devices, any combination of the aforementioned devices.

The user device 104 may generally include a processing device or processing device 1042 communicably coupled to devices such as, a memory device 1046, user output devices 1045 (for example, a user display or a speaker), user input devices 1044 (such as a microphone, keypad, touchpad, touch screen, and the like), a communication device or network interface device 360, a positioning system device 1043, such as a geo-positioning system device like a GPS device, an accelerometer, and the like, one or more chips, and the like.

The processing device 1042 may include functionality to operate one or more software programs or applications, which may be stored in the memory device 320. For example, the processing device 1042 may be capable of operating applications such as a user application 351, an entity application 1048, or a web browser application. The user application 351 or the entity application may then allow the user device 104 to transmit and receive data and instructions to or from the third party system 400, security platform 200, and the managing entity system 500, and display received information via a graphical user interface of the user device 104. The user application 1047 may further allow the user device 104 to transmit and receive data to or from the managing entity system 500 (for example, via wireless communication or NFC channels), data and instructions to or from the security platform 200, web content, such as, for example, location-based content and/or other web page content, according to a Wireless Application Protocol (WAP), Hypertext Transfer Protocol (HTTP), and/or the like. The user application 1047 may allow the managing entity 500 to present the user 102 with a plurality of recommendations, suggestions, requests, blockchain data, graph data, statistics, and/or the like.

The processing device 1042 may be configured to use the communication device 1041 to communicate with one or more devices on a network 101 such as, but not limited to the third party system 400, the security platform 200, and the managing entity system 500. In this regard the processing device 1042 may be configured to provide signals to and receive signals from the communication device 1041. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 1041 may also include a user activity interface presented in user output devices 1045 in order to allow a user 102 to execute some or all of the processes described herein. The application interface may have the ability to connect to and communicate with an external data storage on a separate system within the network 101. The user output devices 1045 may include a display (e.g., a liquid crystal display (LCD) or the like) and a speaker 334 or other audio device, which are operatively coupled to the processing device 1042. The user input devices 1044, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 1046 operatively coupled to the processing device 1042. Typically, one or more applications 351 and 352, are loaded into the temporarily memory during use. As used herein, memory may include any computer readable medium configured to store data, code, or other information. The memory device 1046 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the security platform 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

Figure 4:
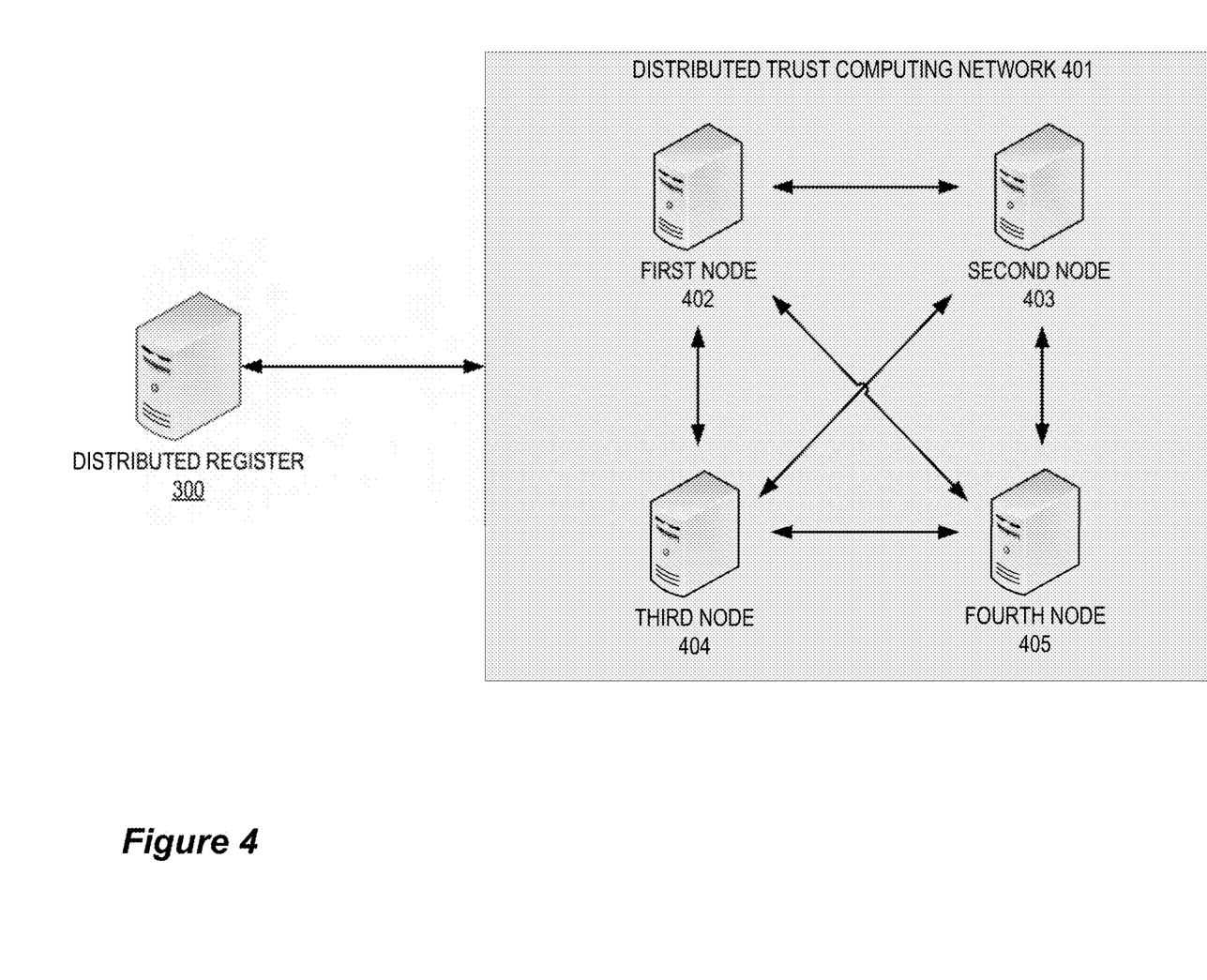
FIG. 4 is a block diagram illustrating an operating environment for a distributed trust computing network, in accordance with some embodiments of the invention.

FIG. 4 is a block diagram illustrating an operating environment for the distributed trust computing network 401, in accordance with some embodiments of the present disclosure. In particular, the operating environment may include a plurality of distributed register nodes 402, 403, 404, and 405 in operative communication with one another within the distributed trust computing network 401. The distributed trust computing network 401, as well as other networks as described herein, may operate communicatively between nodes using a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 402, the second distributed register node 403, the third distributed register node 404, and the fourth distributed register node 405 may be computing systems which collectively validate information on the distributed register 300. Accordingly, the distributed register nodes 402, 403, 404, and 405 are typically networked terminals or servers, but may also be desktop computers, laptops, smartphones or smart devices, IoT devices, or the like, or any combination thereof. Typically, each distributed register node 402, 403, 404, and 405 hosts a complete copy of the distributed register. The contents of the various copies of the distributed register hosted on the distributed register nodes 402, 403, 404, and 405 may be updated to be consistent with one another via a consensus algorithm executed by the distributed register nodes 402, 403, 404, and 405. In this way, a complete and verified copy of the distributed register may remain accessible even if the copy of the distributed register stored on one or more distributed register nodes 402, 403, 404, and 405 become inaccessible (e.g., due to being offline, experiencing high network latency, or the like) or corrupted (e.g., due to hardware/software errors, unauthorized modification of distributed register contents, or the like). It is understood that while four nodes are depicted in the embodiment shown in FIG. 3, there may be any number of nodes ("N" number of nodes) which make up the distributed trust computing network 401 and operate to validate entries and maintain a complete copy of the distributed register.

The operating environment may further comprise the distributed register 300 which may be in operative communication with the distributed register nodes 402, 403, 404, and 405 of the distributed trust computing network 401. The distributed register 300 may be a computing system that submits data to the nodes 402, 403, 404, and 405 in the form of proposed data records to be added to the distributed register 300. The distributed register 300 may further be used to manage interjectors and receive notifications regarding the data within the distributed register. Accordingly, the distributed register 300 may be one or more desktop computers, laptop computers, smartphones, tablets, smart devices, IoT devices, single board computers, or the like. In some embodiments, distributed register 300 may be operated by a user within the entity. In other embodiments, the distributed register 300 may automatically perform various functions to manage submitted or retrieved data or interjectors.

The submission and receipt of data between distributed register 300 and the distributed trust computing network 401 may be achieved through one or more nodes described in FIG. 1 (e.g., the node 1, the node 2, or the like) and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to entity side systems. The distributed register 300 may be designed to provide access to data stored on the distributed register to third party systems as well. For instance, the third party system may comprise an overseeing entity conducting an investigation or study of data history or patterns within the data stored on the distributed register.

It should be understood by those having ordinary skill in the art that although the distributed register nodes 402, 403, 404, and 405, and/or the distributed register 300 are depicted as single units, each of the depicted components, or sub-components therein, may represent multiple units. In some embodiments, a given computing system as depicted in FIG. 3 may represent multiple systems configured to operate in a distributed fashion. In other embodiments, the functions of multiple computing systems may be accomplished by a single system. For instance, the functions of the data monitoring system 106 may be accomplished by one or more of the distributed register nodes 402, 403, 404, and 405. It should further be understood that even though reference may be made to a single "distributed trust computing network 401," all singular usages of "distributed trust computing network" or "distributed register" may also refer to multiple distributed registers. For instance, separate distributed registers may be stored on the nodes 402, 403, 404, and 405 on a per-application or per-parameter basis.

FIG. 5 is a process flow diagram illustrating NFT registration and transaction execution, in accordance with some embodiments of the invention. In some embodiments, the security platform 200 displays an application portal interface via a graphical user interface on one or more user devices 104. As discussed with regard to FIGS. 2 and 3, the application portal 254 may include a web portal or web interface 270, a mobile application 271, or otherwise some interface between the user device 104 and the security platform 200 which allows an API data request to be submitted and automatically executed. As shown in block 501, the security platform 200 may receive digital content for upload to the distribution platform via the application portal 254, web interface 270, or mobile application 271. In some embodiments, this may include a specialized interface known as the NFT registration module 502.

As illustrated in FIG. 5 at block 506, the NFT registration module may communicate with a processing server or data repository of the security platform 200, which may contain one or more NFT wallets 504 for each user or customer. Data stored in the security platform 200 data repository may be selectively shared or authenticated in response to an API call from one or more third party systems 400. For instance, an eCommerce transaction server may make open API calls to fetch dynamic customer NFT data at the time of a transaction.

A customer or user can opt to use the NFT feature in a shopping context, during checkout. In this way, the user may present their NFT to the third party system(s) 400 in order to show proof of their identity. The third party system(s) 400 may scan a QR code, visually identity the NFT, receive a public key, wallet address, or the like, in the process of the user presenting the NFT for verification. The user may access their NFT wallet 504 via the system application provided on their mobile device by the security platform 200. Third party system(s) 400 may communicate with the managing security platform 200 in order to access an existing user account of the user via the customer NFT validation module 253, which further contains a customer reference database 280 and customer account data 281, which can be used to cross-reference the NFT information received from the user at the third party system 400. In other embodiments, the security platform 200 may host one or more system specific user accounts in data repository 256. Next, the process continues by conducting a multi-level authentication, wherein the user may provide other information in addition to their registered NFT(s), such as a one-time password issued by the security platform 200. Security authentication information can be communicated back to the security platform 200 in order to further verify the user's identity. If authentication of the NFT or the one time password fails, the process may either terminate or revert to one or more of the multi-level authentication techniques, depending on the rules of the system platform 200, rules of the third party systems 400, the value of the transaction, or the like.

In either case, it is understood that the user may provide authentication credentials, in the form of a username, password, biometric authentication, multi factor authentication, or the like, via the user device 104, in order to further verify and access their specific user account on the security platform 200. The user account is used by the security platform 200 in order to store user-submitted digital content, store user preferences, transact resources to or from a user's resource account, or the like. In some embodiments, the security platform 200 may host a number of different digital wallets within the user account, while in other embodiments, the security platform 200 may interface with the managing entity system 500 in order to access resources in an existing resource account of the user, such as a traditional bank account, or the like. If the NFT can be authenticated, or the multi-level authentication 508 process as a whole is successful, the process proceeds to forward the transaction data to a payment processing module 510, wherein the payment may be processed and sent to the receiving party from the customer or user's account.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for user verification using unique digital content, the system comprising:
   at least one non-transitory storage device; and
   at least one processing device coupled to the at least one non-transitory storage device, wherein the at least one processing device is configured to:
      utilize a non-fungible token validation module configured to store one or more non-fungible tokens in a user wallet on a distributed network, authenticate the signature of each NFT to ensure validity, and manage a distributed network transaction related to the one or more non-fungible tokens;
      generate a user account containing one or more user credentials for a user, and cross reference the user account with the user wallet and the one or more non-fungible tokens;

receive a request to verify the user based on the one or more non-fungible tokens;

retrieve data from the distributed network via the non-fungible token validation module, wherein the data comprises transaction information relevant to the one or more non-fungible tokens;

access the user account and the user wallet via a data analysis module to verify ownership of the one or more non-fungible tokens based on the user account, the user wallet and the data from the distributed network; and transmit verification of the user's identity based on verifying ownership of the one or more non-fungible tokens.

2. The system of claim 1, further configured to provide access to the user wallet via a mobile application on a user device.

3. The system of claim 1, wherein the request to verify the user based on the one or more non-fungible tokens further comprises a wallet address.

4. The system of claim 1, wherein verifying ownership of the one or more non-fungible tokens further comprises accessing a distributed register to verify ownership history for the one or more non-fungible tokens.

5. The system of claim 1, wherein verification of the user's identity further comprises using a one-time password in addition to the one or more non-fungible tokens.

6. The system of claim 1, further comprising receiving a transaction request accompanying the request to verify the user.

7. The system of claim 1, wherein the one or more non-fungible tokens further comprise one or more visual image files stored on a distributed register.

8. A computer program product for user verification using unique digital content, the computer program product comprising at least one non-transitory computer-readable medium having computer-readable program code portions embodied therein, the computer-readable program code portions comprising:

an executable portion configured to utilize a non-fungible token validation module to store one or more non-fungible tokens in a user wallet on a distributed network, authenticate the blockchain signature of each NFT to ensure validity, and manage a distributed network transaction related to the one or more non-fungible tokens;

an executable portion configured to generate a user account containing one or more user credentials for a user, and cross reference the user account with the user wallet and one or more non-fungible tokens;

an executable portion configured to receive a request to verify the user based on the one or more non-fungible tokens;

an executable portion configured to retrieve data from the distributed network via the non-fungible token validation module, wherein the data comprises transaction information relevant to the one or more non-fungible tokens;

an executable portion configured to access the user account and the user wallet via a data analysis module to verify ownership of the one or more non-fungible tokens based on the user account, the user wallet and the data from the distributed network; and an executable portion configured to transmit verification of the user's identity based on verifying ownership of the one or more non-fungible tokens.

9. The computer program product of claim 8, further configured to provide access to the user wallet via a mobile application on a user device.

10. The computer program product of claim 8, wherein the request to verify the user based on the one or more non-fungible tokens further comprises a wallet address.

11. The computer program product of claim 8, wherein verifying ownership of the one or more non-fungible tokens further comprises accessing a distributed register to verify ownership history for the one or more non-fungible tokens.

12. The computer program product of claim 8, wherein verification of the user's identity further comprises using a one-time password in addition to the one or more non-fungible tokens.

13. The computer program product of claim 8, further comprising receiving a transaction request accompanying the request to verify the user.

14. The computer program product of claim 8, wherein the one or more non-fungible tokens further comprise one or more visual image files stored on a distributed register.

15. A computer-implemented method for user verification using unique digital content, the method comprising:

providing a computing system comprising a computer processing device and a non-transitory computer readable medium, wherein the computer readable medium comprises configured computer program instruction code, such that when said instruction code is operated by said computer processing device, said computer processing device performs the following operations:

utilize a non-fungible token validation module configured to store one or more non-fungible tokens in a user wallet on a distributed network, authenticate the blockchain signature of each NFT to ensure validity, and manage a distributed network transaction related to the one or more non-fungible tokens;

generate a user account containing one or more user credentials for a user, and cross reference the user account with the user wallet and one or more non-fungible tokens;

receive a request to verify the user based on the one or more non-fungible tokens;

retrieve data from the distributed network via the non-fungible token validation module, wherein the data comprises transaction information relevant to the one or more non-fungible tokens;

access the user account and the user wallet via a data analysis module to verify ownership of the one or more non-fungible tokens based on the user account, the user wallet and the data from the distributed network; and transmit verification of the user's identity based on verifying ownership of the one or more non-fungible tokens.

16. The computer-implemented method of claim 15, further comprising providing access to the user wallet via a mobile application on a user device.

17. The computer-implemented method of claim 15, wherein the request to verify the user based on the one or more non-fungible tokens further comprises a wallet address.

18. The computer-implemented method of claim 15, wherein verifying ownership of the one or more non-fungible tokens further comprises accessing a distributed register to verify ownership history for the one or more non-fungible tokens.

19. The computer-implemented method of claim 15, wherein verification of the user's identity further comprises using a one-time password in addition to the one or more non-fungible tokens.

20. The computer-implemented method of claim 15, further comprising receiving a transaction request accompanying the request to verify the user.

* * * * *